(12) United States Patent
Ansorge et al.

(10) Patent No.: US 8,727,136 B2
(45) Date of Patent: May 20, 2014

(54) MICROFILTRATION MEMBRANE WITH IMPROVED FILTRATION PROPERTIES

(75) Inventors: Wolfgang Ansorge, Essen (DE); Oliver Schuster, Gevelsberg (DE); Friedbert Wechs, Wörth (DE); Klaus Dombrowski, Köln (DE)

(73) Assignee: Membrana GmbH, Wuppertal (DE)

( * ) Notice: Subject to any disclaimer, the term of this patent is extended or adjusted under 35 U.S.C. 154(b) by 418 days.

(21) Appl. No.: 12/789,593

(22) Filed: May 28, 2010

(65) Prior Publication Data
US 2010/0230843 A1 Sep. 16, 2010

Related U.S. Application Data

(62) Division of application No. 11/914,768, filed as application No. PCT/EP2006/005346 on Jun. 3, 2006, now abandoned.

(30) Foreign Application Priority Data

Jun. 9, 2005 (DE) .......................... 10 2005 026 804

(51) Int. Cl.
 *B01D 63/08* (2006.01)
 *B01D 71/68* (2006.01)
 *C02F 1/00* (2006.01)
 *B01D 67/00* (2006.01)
(52) U.S. Cl.
 CPC ........ *B01D 63/081* (2013.01); *B01D 2325/022* (2013.01); *B01D 2325/023* (2013.01); *B01D 71/68* (2013.01); *B01D 67/0011* (2013.01)
 USPC .................. 210/500.41; 210/321.84
(58) Field of Classification Search
 CPC .... B01D 61/147; B01D 63/08; B01D 63/081; B01D 67/0011; B01D 67/0016; B01D 69/06; B01D 71/68; B01D 2325/02; B01D 2325/022; B01D 2325/023
 See application file for complete search history.

(56) References Cited

U.S. PATENT DOCUMENTS 3,851,025 A * 11/1974 Ram ................................ 264/41
4,933,081 A    6/1990 Sasaki et al.
(Continued)

FOREIGN PATENT DOCUMENTS

| DE | 4230077 A1 | 10/1994 |
| EP | 361085 A1 | 4/1990 |
| WO | WO 9825758 A | 6/1998 |
| WO | WO 9904891 A | 4/1999 |

OTHER PUBLICATIONS

Ashland ISP Performance Chemicals, "PVP K-30", available at <http://online1.ispcorp.com>, accessed May 21, 2012.*

*Primary Examiner* — Katherine Zalasky
(74) *Attorney, Agent, or Firm* — Hammer & Associates, P.C.

(57) ABSTRACT

Method for producing this membrane from a casting solution comprising the hydrophobic first sulfone polymer and the hydrophilic second polymer in a solvent system, the method comprising the steps of pouring the casting solution, conditioned to a molding temperature, onto a carrier to form a film, which carrier has a temperature that is higher in comparison to the molding temperature, conveying the film through a climate-controlled zone, initiating the coagulation in a coagulation bath for the formation of a membrane structure, withdrawing the membrane structure from the carrier with a speed that is increased in comparison to the carrier speed, stabilizing, extracting, and subsequently drying the membrane.

9 Claims, 3 Drawing Sheets

(56) References Cited

U.S. PATENT DOCUMENTS

Figure 1:
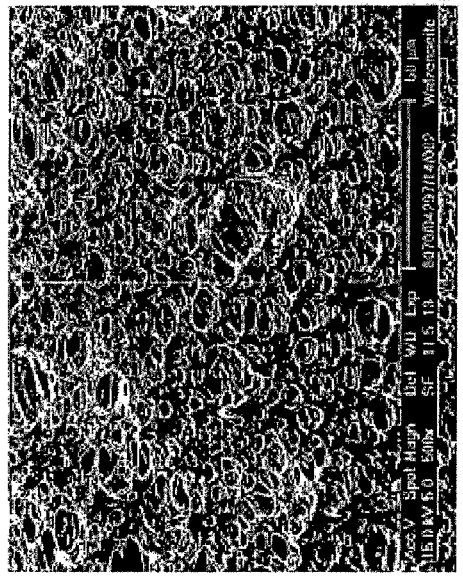

| | | |
|---|---|---|
| 5,846,422 A | 12/1998 | Ditter et al. |
| 5,866,059 A | 2/1999 | Fujiwara et al. |
| 5,879,554 A | 3/1999 | Loffelmann et al. |
| 5,906,742 A | 5/1999 | Wang et al. |
| 5,919,370 A * | 7/1999 | Rottger et al. ............... 210/646 |
| 6,183,640 B1 | 2/2001 | Wang |
| 6,258,272 B1 | 7/2001 | Wang et al. |
| 7,160,927 B2 | 1/2007 | Schindler et al. |
| 2004/0054125 A1* | 3/2004 | Schindler et al. ............ 528/391 |

* cited by examiner

MICROFILTRATION MEMBRANE WITH IMPROVED FILTRATION PROPERTIES

RELATED APPLICATION

This application is a divisional application which claims the benefit of earlier filed application Ser. No. 11/914,768 filed on Jun. 3, 2006 which is now abandoned.

DESCRIPTION

The invention relates to an integrally asymmetric membrane for microfiltration, based on a film-forming hydrophobic first polymer from the group of sulfone polymers, the membrane having a porous structure with a pore size distribution over the membrane wall, and having a separating layer in the wall's interior with a minimal pore size, and also having, in the direction from this separating layer towards the first surface, a first asymmetrical region, and, towards the second surface, a second asymmetrical region, with pore sizes increasing towards the surfaces. The invention further relates to a method for producing such membranes.

Microporous polymer membranes are used in a wide range of industrial, pharmaceutical, or medical applications for high-precision filtration. In these applications, membrane separation processes are gaining increasingly in importance, as these processes offer the advantage that the substances to be separated are not thermally stressed or affected. Microfiltration membranes enable, for example, the removal of fine particles or micro-organisms in sizes down to the submicron range and are therefore suitable for producing purified water for use in laboratories or for the semi-conductor industry. Numerous further applications of membrane separation processes are known from the beverage industry, biotechnology sector, or wastewater technology.

In these cases, membranes with a high degree of asymmetry are preferably used, which membranes have a separating layer and an adjoining microporous supporting structure with coarser pores in comparison to the separating layer. The pores in the separating layer thereby determine the actual separation characteristic of the membrane, i.e. the size of the particles or molecules that are retained by the membrane is controlled by the size of the pores in the separating layer. In the application, membranes of this type are often used in such a way, that the liquid flows into them from the more open-pored side and so the microporous supporting layer functions as a prefilter for the separating layer. By this means, the dirt-loading capacity of the membrane is increased. A fluid that flows through the membrane in such a way enters first in the larger pores and finally in the smaller pores of the separating layer. By this means, particles that are contained in the fluid are retained in the coarse-pored supporting layer before they reach the separating layer and can block it.

In these cases, sulfone polymers like, e.g. polysulfone or polyethersulfone represent a widely used membrane material, not least because of their high chemical stability, their temperature stability or the sterilizability of the membranes manufactured from them. Admittedly, these polymers are hydrophobic polymers, which limits their use for the filtration of aqueous media. In addition it is known that membranes made of hydrophobic material have a strong, non-specific ability to adsorb, due to which in use often results rapid covering of the membrane surface by predominantly higher-molecular components of the liquid to be filtered and subsequently a decrease in permeability.

U.S. Pat. No. 5,866,059 discloses a polyethersulfone membrane for microfiltration, whereby the membrane has a pronounced asymmetric structure with a skin that has relatively small pores on the one, first side of the membrane and the pore size increases from this side over the membrane wall to the other, second side of the membrane, whereby the pores on the second side are larger than the pores in the skin on the first side by a factor of 50 to 10 000. Membranes with this type of structure are on the one hand susceptible to mechanical damages with regard to the layer with the smallest pores, i.e. the separating layer that is located on the surface of the membrane. On the other hand, the membranes have only a moderate mechanical stability due to the specific asymmetric structure.

The membranes produced according to U.S. Pat. No. 5,866,059 are hydrophobic and can at most be hydrophilized by an aftertreatment. In contrast, the integrally asymmetric membranes based on a sulfone polymer disclosed in U.S. Pat. No. 6,045,899 have hydrophilic characteristics, as during the production of these membranes a hydrophilic polymer like e.g. polyvinylpyrrolidone is added to the polymer solution.

Likewise, U.S. Pat. No. 5,906,742 discloses hydrophilic integrally asymmetric polymer membranes based on a sulfone polymer. These membranes have a microporous skin and an adjoining porous supporting structure, whereby the porous supporting structure has an isotropic region with essentially constant pore size adjoining the skin, and further has, adjoining this isotropic region, an asymmetrical region with pore sizes increasing, starting from the isotropic region. The isotropic region extends over approximately 15-25% of the wall, whereby the size of the pores in the isotropic region is somewhat larger than the size of the pores in the microporous skin. For these membranes as well, the skin, which forms the separating layer, is susceptible to mechanical damages. Due to the relatively broad isotropic region with small pore sizes, relatively high pressure drops are to be expected for these membranes during the passage of a fluid.

U.S. Pat. No. 4,933,081 discloses microporous polysulfone membranes, whose separating layer is located within the membrane wall for the prevention of the susceptibility of the separating layer to mechanical damage. These membranes have a pore size distribution over the membrane wall and have a layer with minimal pore sizes at a distance of preferably 1-30 μm from one of the membrane surfaces. The pore size increases in the direction from this layer with minimal pore size towards both surfaces of the membrane. The diameter of the pores in the surface facing the separating layer is smaller by a factor of 10-100 than that of the pores in the surface facing away from the separating layer, whereby the membranes in U.S. Pat. No. 4,933,081 have a high asymmetry. The membranes from U.S. Pat. No. 4,933,081 are, however, hydrophobic, and must be subjected to a further treatment in order to make them hydrophilic.

EP-A-361 085 discloses integrally asymmetric membranes made of polyethersulfone. In the examples, hollow-fiber membranes are described that have in the outer region an approx. 50-100 μm thick fine-pored structure open towards the outside, which structure at the membrane center passes into an increasingly coarser-pored structure. Towards the lumen side, the structure compacts again. The inner surface of this membrane is open-pored. The transmembrane flows of the membranes revealed in EP-A-361 085 are relatively low.

Object of the present invention is therefore to provide a membrane based on a sulfone polymer, in particular for microfiltration, that has hydrophilic characteristics, a high permeability as well as a high dirt-loading capacity, and is not susceptible to mechanical attacks. Object of the present invention is further to provide a method for producing such a membrane.

The object according to the invention is achieved through an integrally asymmetric membrane in the form of a flat sheet, in particular for microfiltration, based on a film-forming hydrophobic first polymer from the group of aromatic sulfone polymers, the membrane having a membrane wall with a first and a second porous surface and an interior situated between the surfaces, possessing a porous structure with a pore size distribution over the membrane wall, and having a separating layer in the wall's interior with a minimal pore size, and also having, in the direction from this separating layer towards the first surface, a first asymmetrical region, and, towards the second surface, a second asymmetrical region, with pore sizes increasing towards the surfaces, and the second surface having pores with a mean diameter of at least 1 µm, the membrane being characterized in that it comprises at least 40 wt. % of the film-forming hydrophobic first polymer, and also comprises a hydrophilic second polymer, the concentration of the hydrophilic second polymer being 0.1-10 wt. % relative to the weight of the membrane, and the separating layer with minimal pore size is located in an region of the membrane wall facing the first surface, and the pore size passes through a maximum in the direction from the second asymmetrical region towards the second surface.

Since the separating layer with minimal pore size for the membrane according to the invention is located within the membrane wall, it is protected from mechanical damages caused by, for example, the processing of the membrane for embedding in a housing, in particular e.g. the pleating of the flat membrane, or cleaning cycles during use. Preferably the separating layer with minimal pore size is located at a distance of 3-30% of the thickness of the membrane wall from the first surface. In addition to using suitable scanning or transmission electron microscope images, the existence of an internal separating layer can also be demonstrated by means of simple staining techniques. By means of staining technique, the different pore sizes over the membrane cross-section can be made visible with a light microscope at suitable magnification. Depending on the size of the pores, the intensity of the staining of the membrane structure varies, whereby the staining is more intense the more finely pored the structure is.

According to the invention, the pore size passes through a maximum in the direction from the second asymmetrical region towards the second surface, whereby the maximum has a distance from the second surface of preferably 3-75% of the thickness of the membrane wall. In an advantageous embodiment of the membrane according to the invention, the maximum of the pore size is located in an essentially isotropic region adjoining the second asymmetrical region, or is part of this isotropic region, whereby the isotropic region preferably extends over 15-70% of the membrane wall. Within the context of the present invention, an essentially isotropic region is understood to be a region of the membrane wall with an essentially constant pore size, whereby an assessment is carried out by means of scanning or transmission electron microscope images. The isotropic region can also be regarded as a region in which the flow channels extending through the membrane wall have an essentially constant average diameter. As is true for every membrane, the actual pore size also varies somewhat in the membrane according to the invention, i.e. it has a certain pore size distribution, even when the pore size distribution appears visually isotropic. Therefore, the invention comprises also embodiments with the essentially isotropic region, in which the pore size changes by a maximum of approx. 15-20%. Due to the preferred existence of an isotropic region, in which the pore size does not increase further, an improvement of the mechanical stability is achieved while simultaneously retaining a high dirt-loading capacity.

The pore size of the membrane according to the invention, after passing through the maximum or passing the isotropic region, decreases in the direction towards the second surface. In order to realize a high permeability and a high dirt-loading capacity of the membrane, a highly open-pored structure and, in particular in the case of the presence of an isotropic region, large pore diameters in the second surface are aimed for, whereby the pores in the surface are smaller than the pores in the layer in which the maximum of the pore size is present. According to the invention, the average diameter of the pores in the second surface is at least 1 µm and preferably at least 2 µm and more preferably at least 5 µm.

In a preferred embodiment of the membrane according to the invention, the ratio of the average size of the pores in the second surface to the average size of the pores in the first surface is at least 5 and more preferably at least 10. In membranes of this type, a high dirt-loading capacity is achieved due to the pronounced asymmetry in connection with the high openness of the second surface.

Due to its specific structure, the membrane according to the invention possesses, simultaneously with the high dirt-loading capacity, a high stability or mechanical strength, whereby this stability is also retained at high volume porosities of the membrane. Such strengths are not achieved in comparable membranes, in which the asymmetrical region with increasing pore size extends to the second surface of the membrane wall. The membrane according to the invention can have, therefore, at the same time a high volume porosity that is advantageous for a high permeability and thus for a high transmembrane flow as well as for a high dirt-loading capacity. Preferably, the membrane according to the invention has a volume porosity of at least 75 vol. % and more preferably at least 80 vol. %, whereby it has proved particularly advantageous if the porosity lies between 80 and 90 vol. %.

Within the context of the present invention, the dirt-loading capacity in regards to the pore blocking behavior of the membrane during the fluid flow through the membrane is determined by means of a test medium based on an aqueous solution of soluble instant coffee powder. From the change of the transmembrane flow $TMF_{PM}$ of this test solution through the membrane over time, a statement about the pore blocking behavior of the membrane and thereby about the dirt-loading capacity can be derived. The membrane shows thereby a high dirt-loading capacity, if the transmembrane flow $TMF_{PM}$ of the test medium over time changes only slightly, which can be ascribed to the fact that the membrane is not appreciably blocked. The membrane according to the invention has preferably a residual of the transmembrane flow $TMF_{PM}$ of a test medium, consisting of an aqueous solution of 0.04 g soluble instant coffee powder per liter of water, of at least 0.5, preferably at least 0.65, whereby the residual of the transmembrane flow $TMF_{PM}$ is defined as the ratio of the $TMF_{PM}$ after a testing time of 10 minutes to the $TMF_{PM}$ at the beginning of the measurement.

The object according to the invention is further achieved by a method for producing the membrane according to the invention, the method comprising the following steps:

a. producing a homogeneous casting solution from a polymer component and a solvent system, the polymer component consisting of 10-25 wt. %, relative to the weight of the solution, of a hydrophobic first polymer from the group of aromatic sulfone polymers, and 2-20 wt. %, relative to the weight of the solution, of a hydrophilic second polymer, and the solvent system consisting of 5-80 wt. %, relative to the weight of the solvent system, of a solvent for the polymer component, 0-80 wt. %, relative to the weight of the solvent system, of a latent solvent for the polymer component, as well as 0-70 wt. %, relative to the weight of the solvent system, of a non-solvent for the polymer component, b. conditioning the homogeneous casting solution to a molding temperature, c. pouring the homogeneous casting solution onto a carrier to form a film, which carrier can be temperature controlled and has a temperature that is higher than the molding temperature of the casting solution, and which carrier has a speed $v_1$, d. conveying the film located on the carrier through a climate-controlled zone, e. introducing the film located on the carrier into a coagulation medium and initiating the coagulation of the film for the formation of a membrane structure, f. withdrawing the membrane structure from the carrier within the coagulation medium by means of withdrawal device moving with a speed of $v_2$, the speed $v_2$ being greater than the speed $v_1$ of the carrier, by which means the membrane structure is drawn, g. stabilizing the membrane structure in the coagulation medium, h. extracting the resulting membrane and subsequently drying the membrane.

The solvent system used for the preparation of the casting solution is to be adapted to the membrane-forming sulfone polymer. Preferably, the solvent system comprises polar, aprotic solvents like dimethylformamide, dimethylacetamide, dimethyl sulfoxide, N-methylpyrrolidone, or a mixture of these, or protic solvents like ε-caprolactam. Additionally, the solvent system can contain up to 80 wt. % of latent solvent, whereby in the context of the present invention a latent solvent is understood as a solvent that dissolves the sulfone polymer poorly or only at increased temperature. In the case of using ε-caprolactam as the solvent, for example γ-butyrolactone, propylene carbonate, polyalkylene glycol can be used. In addition to this, the solvent system can contain non-solvents for the membrane-forming polymer, like, e.g., water, glycerin, low-molecular polyethylene glycols with a weight average of the molecular weight of less than 1 000 daltons or low-molecular alcohols, such as ethanol or isopropanol.

For the realization of the method according to the invention and for the formation of the characteristic structure of the membrane according to the invention, it is advantageous if the viscosity of the casting solution is set to a value below 10 Pa s, and more advantageous if it is set to a value below 5 Pa s, whereby the viscosity is determined at 40° C. The setting of the viscosity can occur in particular through the selection and concentration of the hydrophilic second polymer used in the method according to the invention.

The pouring of the casting solution to form a film can take place according to methods known per se, for example by means of conventional forming tools like sheeting dies, casting molds, or doctor blades. At the latest, the casting solution is set to the molding temperature in the forming tool. The pouring of the casting solution takes place on a carrier that can be temperature controlled; here also, one can resort to the conventional carriers, from which the coagulated membrane can be withdrawn later. For example, coated papers or steel tapes can be used. Preferably, the temperature-controllable carrier is a heating roll that can be temperature controlled, i.e. a casting roller, onto which the film is poured.

It is essential to the invention that the temperature of the carrier is higher than the molding temperature of the casting solution. By this means, a viscosity gradient develops in the casting solution over the thickness of the poured film. Due to the increased carrier temperature, the poured film has a lower viscosity in the region of the carrier, by which means coarser-pored structures are formed during later contact with the coagulation medium. The carrier temperature is preferably at least 15° C. and more preferably at least 20° C. higher than the molding temperature.

In order to create the asymmetric structure with interior separating layer it is furthermore required that the film located on the carrier be conveyed through a climate-controlled zone, in which a defined temperature and a defined relative humidity are set. Preferably, the temperature in the climate-controlled zone lies in the range from 35-55° C., the relative humidity is set preferably to values in the range from 40-75%. The retention time of the film in the climate-controlled zone as well as the overflow speed of the air over the poured film in the climate-controlled zone is to be determined such that a pre-coagulation is induced by pickup of the air humidity acting as a non-solvent and a separating layer with minimal pore size is obtained within the membrane wall. The conditions in the climate-controlled zone have at the same time an influence on the size of the pores in the separating layer.

After passing through the climate-controlled zone, the film located on the carrier is introduced into a coagulation medium and a coagulation for the formation of the membrane structure is initiated. Preferably, the coagulation medium is conditioned to a temperature above room temperature and has more preferably a temperature above 40° C. In a preferred embodiment of the method according to the invention, the coagulation medium is water or a water bath.

In the coagulation medium, the film is initially precipitated to form the membrane structure to the extent that the membrane structure already has a sufficient stability and can be withdrawn from the carrier, i.e. preferably from the casting roller. The withdrawal from the casting roller occurs by means of a withdrawal device, for example by means of a drawing-off roller, whereby according to the invention the withdrawal speed $v_2$ is greater than the speed $v_1$ of the carrier and the membrane structure is drawn. Preferably, the ratio of the speed $v_2$ of the withdrawal device to the speed $v_1$ of the carrier lies in the range between 1.05:1 and 1.2:1. By this means, a high surface porosity is achieved on the side of the resulting membrane that faced towards the carrier.

Following the withdrawal device, the coagulation is completed in the subsequent coagulation baths and the membrane is stabilized. These coagulation baths can have a higher temperature in comparison to the first, previously described coagulation bath. The temperature can also be increased stepwise from bath to bath. In the coagulation baths thereby simultaneously occurs an extraction of the solvent system and, normally, of parts of the hydrophilic second polymer from the membrane structure, so that the coagulation baths function simultaneously as wash or extraction baths. As a coagulation or wash medium in these coagulation or wash baths, water is preferably used.

After the extraction, the resulting membrane is dried, for example, by means of a drum dryer, and the dried membrane is thereafter wound up. During the extraction and drying of the membrane, a minor drawing is likewise advantageous, in order to set well-defined membrane characteristics, such as, e.g. the surface porosity and the separation characteristics.

According to the invention, the membranes are based on a hydrophobic first polymer from the group of aromatic sulfone polymers and contain in addition a hydrophilic second polymer. As the aromatic sulfone polymer in the context of the present invention, e.g. polysulfones, polyethersulfones, polyphenylene sulfones, polyarylethersulfones or copolymers or modifications of these polymers or mixtures of these polymers can be used. In a preferred embodiment, the hydrophobic first polymer is a polysulfone or a polyethersulfone with the repeating molecular units shown in formulas (I) and (II) as follows:

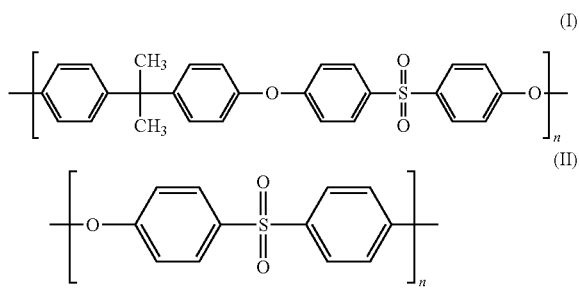

More preferably, a polyethersulfone according to formula (II) is used as the hydrophobic first polymer, because this has lower hydrophobicity than, for example, the polysulfone.

Long-chain polymers are used advantageously as the hydrophilic second polymer that have a good compatibility with the hydrophobic first polymer and have repeating polymer units that are in themselves hydrophilic. Those hydrophilic polymers are preferred that have an average molecular weight $M_w$ of more than 10 000 daltons. In the method according to the invention, the polymers used as the hydrophilic second polymers have at the same time the function of increasing the viscosity of the homogeneous spinning solution, i.e. of functioning as a thickener, for which reason these polymers are also often called thickeners. In addition to this, these polymers function also as pore-forming agents or nucleating agents during the formation of the membrane structure. Preferably, the hydrophilic second polymer is polyvinylpyrrolidone, polyethylene glycol, polyvinyl alcohol, polyglycol monoester, polysorbitate, such as, e.g., polyoxyethylene sorbitan monooleate, carboxymethylcellulose, or a modification or a copolymer of these polymers. Polyvinylpyrrolidone is especially preferred. In a further preferred embodiment it is also possible to use mixtures of different hydrophilic polymers and in particular mixtures of hydrophilic polymers with different molecular weights, e.g., mixtures of polymers whose molecular weights differ by a factor of 5 or more. Preferably, the concentration of the hydrophilic second polymer in the membrane according to the invention is 0.5-7 wt. % relative to the weight of the membrane. These polymers furthermore can, if necessary, be modified chemically or physically in the membrane. For instance, polyvinylpyrrolidone can be subsequently cross-linked, e.g. by irradiation with high-energy radiation, and made water-insoluble thereby.

For the modification of the surface characteristics of the membranes according to the invention, additives can be used that influence the stability of the membrane, the color, the ability to adsorb or absorb. There are also additives possible that control the charge of the membrane, e.g., that impart anionic or cationic character to the membrane. Preferably, the membrane according to the invention further contains a hydrophilic third polymer that is different from the hydrophilic second polymer and is a hydrophilically modified aromatic sulfone polymer. Due to the presence of such a polymer, the permeability of the membrane as well as its adsorption characteristics are in particular favorably influenced and the membrane has permanent hydrophilic properties, which manifest themselves in the fact that, among other things, the membrane can be repeatedly steam sterilized and its hydrophilic characteristics remain preserved, essentially unchanged, even after for example 30 sterilization cycles. In an especially preferred embodiment, the hydrophilically modified aromatic sulfone polymer is present in the membrane according to the invention at a concentration of 1-50 wt. % relative to the weight of the membrane, whereby the sum of the polymers yields 100%. Thereby, in the method for producing the preferred membranes according to the invention, the polymer component further comprises a hydrophilic third polymer that is different from the hydrophilic second polymer and is a hydrophilically modified aromatic sulfone polymer. Preferably, the casting solution contains the hydrophilically modified aromatic sulfone polymer homogeneously dissolved at a concentration of 0.2-20 wt. % relative to the weight of the casting solution The hydrophilically modified aromatic sulfone polymer can be of a type, in which hydrophilic functional groups are covalently bound to the sulfone polymer. It can also be a copolymer based on a sulfone polymer, in which hydrophilic segments are contained, for example a copolymer made from a sulfone polymer with a hydrophilic polymer like, e.g., polyvinylpyrrolidone or polyethylene glycol. For reasons of compatibility, it is of particular advantage, if the hydrophilically modified aromatic sulfone polymer is based on the hydrophobic first aromatic sulfone polymer, i.e., the membrane structure contains a mixture of a hydrophobic first aromatic sulfone polymer and a hydrophilic modification of this polymer. Very good results are achieved when the hydrophilically modified aromatic sulfone polymer is a sulfonated sulfone polymer, whereby this sulfonated sulfone polymer has preferably a degree of sulfonation in the range of 3-10%. Membranes according to the invention that contain a combination of polyethersulfone and sulfonated polyethersulfone have particularly high permeabilities for water and proteins as well as a low tendency for adsorption, e.g. of proteins, and therefore a low tendency for fouling.

Not least due to their particular structure and surface characteristics, the membranes according to the invention are distinguished by a high permeability and thereby by a high transmembrane flow for water. The membranes according to the invention have preferably a transmembrane flow TMF of at least 10 000 l/(m²·h·bar), whereby the transmembrane flow subject to the diameter $d_{max}$ of the maximum separating pore satisfies at the same time the condition (III), which mirrors the dependence of the transmembrane flow on the size of the pores in the separating layer:

$$TMF \geq 85\,000 \cdot d_{max}^2, \quad (III)$$

whereby $d_{max}$ is the diameter of the maximum separating pore in μm and represents the diameter of the maximum pore in the separating layer. In a preferred embodiment of the invention, the transmembrane flow satisfies the condition (IV):

$$TMF \geq 105\,000 \cdot d_{max}^2. \quad (IV)$$

The diameter of the maximum separating pore is determined by means of the bubble point method (ASTM nos. 128-61 and F 316-86), for which the method described in DE-A-36 17 724, for example, is suitable. From this, $d_{max}$ results from the gas space pressure $P_B$ associated with the bubble point according to the equation (V):

$$d_{max} = \sigma_B / P_B \quad (V)$$

where $\sigma_B$ is a constant that is mainly dependent on the wetting liquid used for measurement. For water, $\sigma_B$ is 2.07 μm·bar at 25° C. In a more preferred embodiment, the transmembrane flow of the membrane according to the invention is at least 15 000 l/(m²·h·bar).

Surprisingly, the membranes according to the invention show an excellent permeability for aqueous protein solutions. Preferably, the membranes according to the invention have a filtrate flow rate for an aqueous BSA (Bovine Serum Albumin) solution of at least 750 l/h·m², whereby the filtrate flow rate is determined 15 minutes after the beginning of a filtration of an aqueous BSA solution with a BSA concentration of 2 g/l and a pH value of 5 at a transmembrane pressure of 0.4 bar. More preferably, the filtrate flow rate for the aqueous BSA solution is at least 1 000 l/h·m², excellent membranes according to the invention have a filtrate flow rate for the aqueous BSA solution of at least 2 000 l/h·m².

Aside from having a high filtrate flow rate for aqueous protein solutions, the membranes according to the invention are distinguished in that the filtrate flow rate for this type of protein solutions shows a high stability over the filtration period, i.e., only a relatively low reduction of the filtrate flow rate can be determined during the filtration period. Preferred membranes have a residual filtrate flow rate of at least 35%, whereby the residual filtrate flow rate is defined as the ratio of the filtrate flow rate after 120 minutes to the filtrate flow rate after 5 minutes during a filtration of an aqueous BSA solution with a BSA concentration of 2 g/l and a pH value of 5 at a transmembrane pressure of 0.4 bar. More preferably, the residual filtrate flow rate of the membranes according to the invention is at least 45% and most preferred at least 50%. Membranes with such favorable flow rate characteristics in the filtration of protein solutions are unknown in the prior art. In particular, the flow rate characteristics for BSA solutions mentioned are also already found for membranes according to the invention with relatively small pores in the separating layer, i.e., preferably for membranes that have a nominal pore of 0.2 μm. Thereby, the nominal pore is defined via the retention properties of the membrane as regards specific microorganisms. For instance, a membrane with a nominal pore of 0.2 μm, for example, retains bacteria of the genus *Brevundimonas diminuta*, a membrane with a nominal pore of 0.45 μm retains bacteria of the genus *Serratia marcescens*, etc. Other common nominal pore sizes are 0.1 μm, 0.6 μm and 1.2 μm. The testing or the determination of the nominal pore sizes is described, for example, in the HIMA Regulation, No. 3, Vol. 4, 1982 (Health Industry Manufacturers Association).

The membranes according to the invention in the form of flat sheets, i.e. the flat membranes according to the invention are suitable in particular for microfiltration. Membranes of this type have, as a general rule, diameters of the maximum separating pores of 0.01-10 μm, preferably of 0.1-5 μm and more preferably of 0.2-2 μm. Preferably, the flat membrane according to the invention has a thickness of 10-300 μm, more preferably of 30-150 μm.

The invention will now be described in more detail by way of the following examples and figures, whereby the scope of the invention is not limited by the examples.

The drawings show in:

FIG. 1: a scanning electron microscope (SEM) image of the cross-section of the membrane according to Example 1, magnified 600 times.

Figure 2:
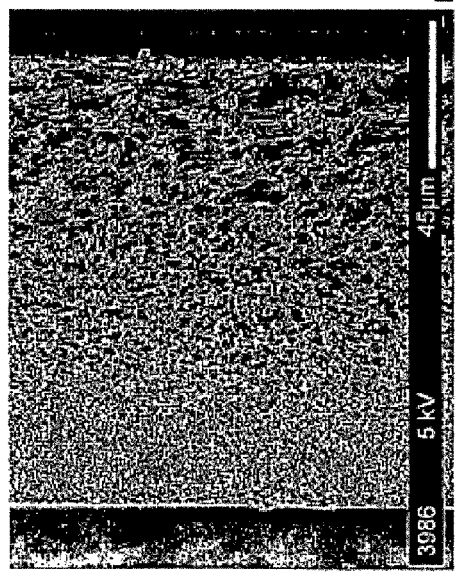

FIG. 2: a SEM image of a section of the cross-section of the membrane according to Example 1 in the region of the membrane side that during production faced towards the casting roller (roller side) with the layer of minimal pore size, magnified 2700 times.

Figure 3:
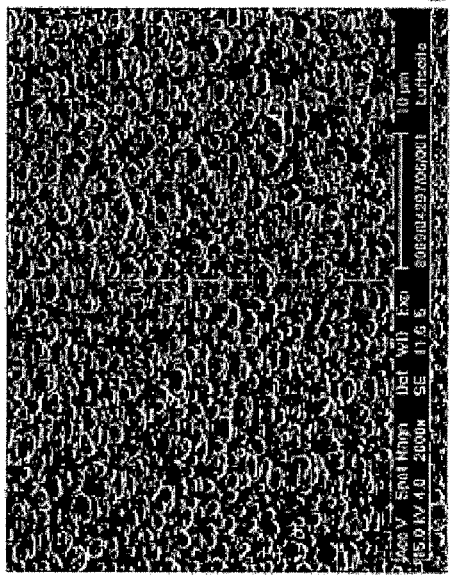

FIG. 3: a SEM image of the surface of the membrane according to Example 1 that during production faced towards the casting roller (roller side), magnified 500 times.

Figure 4:
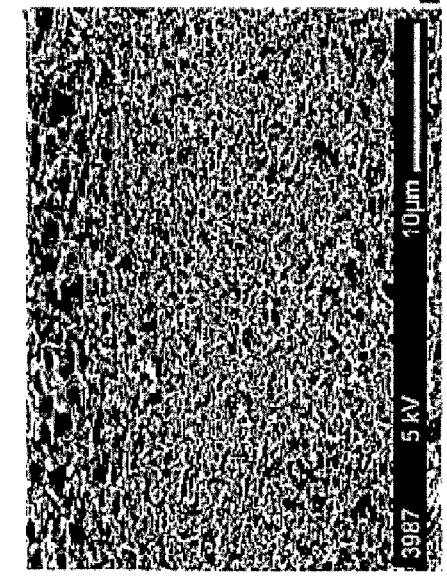

FIG. 4: a SEM image of the surface of the membrane according to Example 1 that during production faced away from the casting roller (air side), magnified 2000 times.

Figure 5:
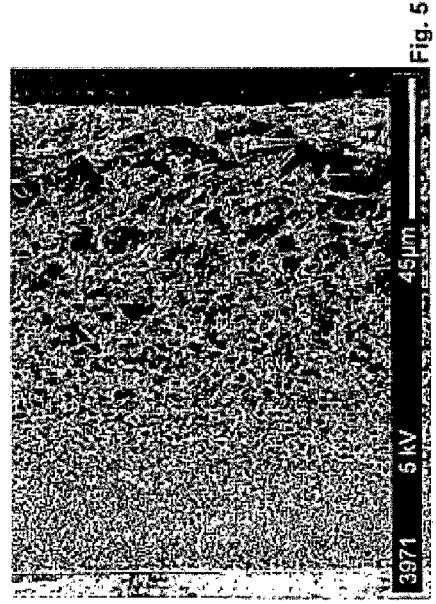

FIG. 5: a SEM image of the cross-section of the membrane according to Example 2, magnified 600 times.

Figure 6:
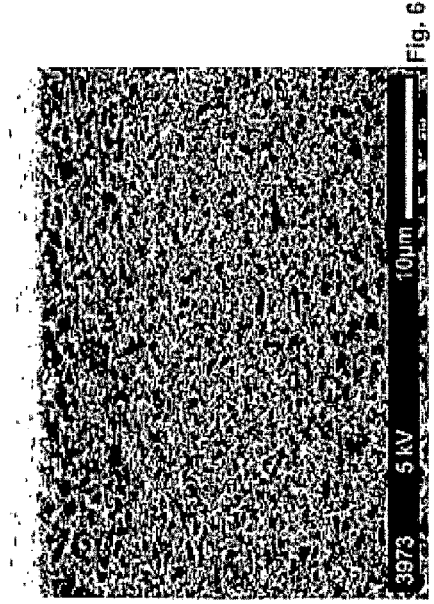

FIG. 6: a SEM image of a section of the cross-section of the membrane according to Example 2 in the region of the membrane side that during production faced towards the casting roller (roller side) with the layer of minimal pore size, magnified 2700 times.

Figure 7:
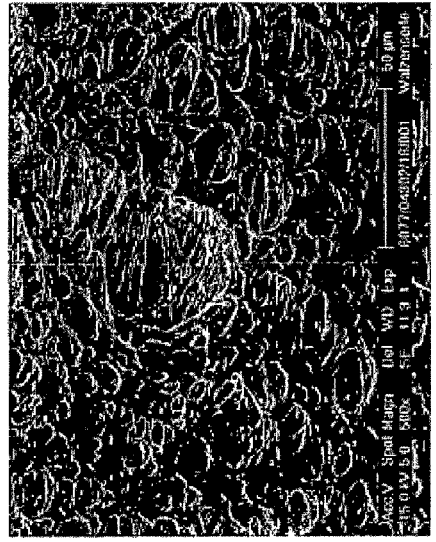

FIG. 7: a SEM image of the surface of the membrane according to Example 2 that during production faced towards the casting roller (roller side), magnified 500 times.

Figure 8:
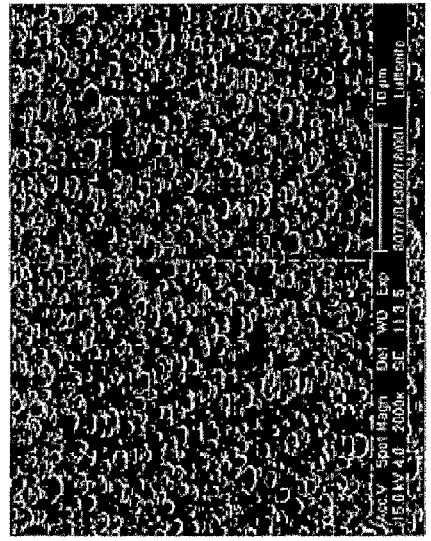

FIG. 8: a SEM image of the surface of the membrane according to Example 2 that during production faced away from the casting roller (air side), magnified 2000 times.

Figure 9:
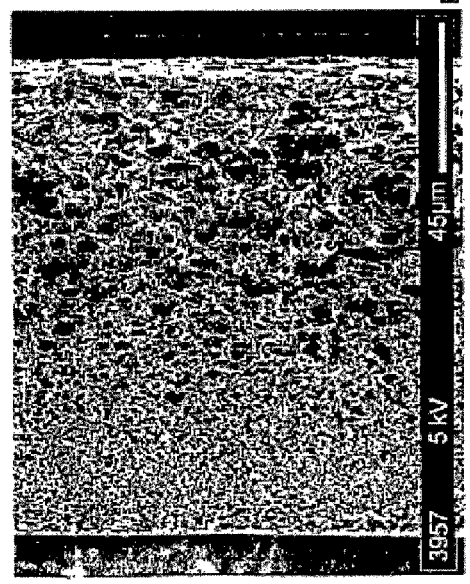

FIG. 9: a SEM image of the cross-section of the membrane according to Example 3, magnified 600 times.

Figure 10:
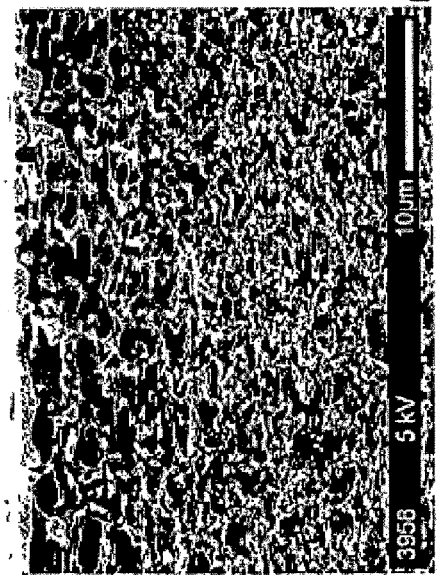

FIG. 10: a SEM image of a section of the cross-section of the membrane according to Example 3 in the region of the membrane side that during production faced towards the casting roller (roller side) with the layer of minimal pore size, magnified 2700 times.

Figure 11:
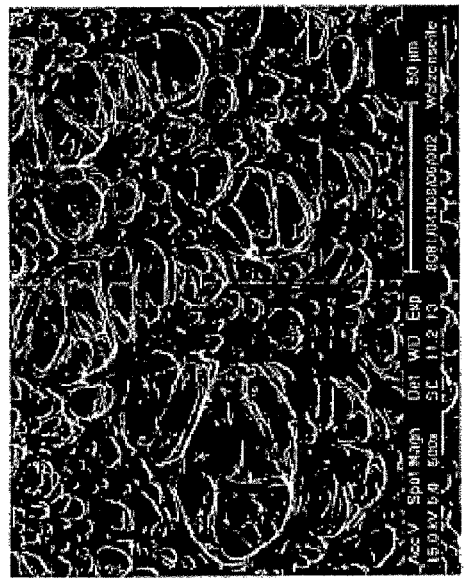

FIG. 11: a SEM image of the surface of the membrane according to Example 3 that during production faced towards the casting roller (roller side), magnified 500 times.

Figure 12:
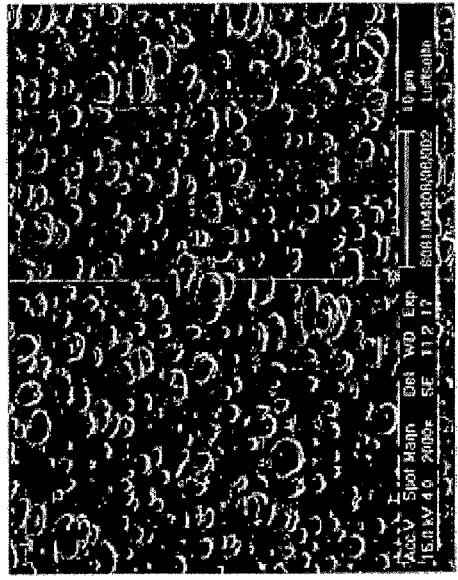

FIG. 12: a SEM image of the surface of the membrane according to Example 3 that during production faced away from the casting roller (air side), magnified 2000 times.

In the examples, the following methods for characterizing the membranes were applied:

Determination of the Volume Porosity:

Four samples of approx. 15 cm² of the membrane to be examined are weighed out and kept in approx. 50 ml of water for 16 hours. Subsequently, the samples are removed from the water and excess water is removed by means of blotting paper. The samples pre-treated in this way are weighed to determine the wet weight and then dried for 16 hours at 50° C. After cooling, the weight of the dried samples (dry weight) is determined.

The volume porosity is determined from the average value of the uptake of water (wet weight minus dry weight), with respect to the average value of the dry weight of the samples, using the densities for water and for the polymer forming the membrane structure (hydrophobic first polymer).

Transmembrane Flow (Water Permeability):

From the membrane to be tested, disc-shaped membrane samples with a diameter of 15 cm are cut out and clamped in a suitable specimen holder fluid-tight at the perimeter, so that a free measuring area of 43.20 cm² results. The specimen holder is located in a housing that can be passed through by water under pressure. Deionized water maintained at 25° C. and at a defined pressure from 0.4-1.0 bar is then passed through the clamped membrane sample from the side on which the membrane separating layer is located. During a measuring period of 60 seconds, the water volume passed through the membrane sample is gravimetrically or volumetrically determined.

The transmembrane flow TMF is determined according to the formula (VI)

$$TMF\left[\frac{l}{m^2 \cdot h \cdot \text{bar}}\right] = \frac{V_W}{\Delta t \cdot A_M \cdot \Delta p} \cdot 600 \quad \text{(VI)}$$

where
$V_w$=the water volume [ml] passed through the membrane sample during the measuring period
$\Delta t$=the measuring period [min]
$A_M$=the area of the membrane sample (43.20 cm$^2$) that was passed through
$\Delta p$=the pressure set during the measurement [bar]

Determination of the Dirt-Loading Capacity:

The dirt-loading capacity is determined via the pore blocking behavior of the membrane during the liquor passage of the membrane by a test medium based on soluble instant coffee powder.

As the test medium, a solution of 200 mg soluble instant coffee powder in 5 l deionized water is prepared in a pressure vessel equipped with a stirrer and by means of the stirrer is maintained homogeneously during the measurement. A membrane sample with a diameter of 50 mm, cut out of the membrane to be examined, is clamped in a filter holder so that the test medium during testing flows against the side facing away from the separating layer, i.e. the more open-pored side, which represents the inflow side. The effective filter area is 9.6 cm$^2$. The test medium is fed at a constant pressure of 0.4 bar from the pressure vessel through the membrane for a period of 10 minutes. The volume of the test medium passed through is recorded over time and from the data, the transmembrane flow $TMF_{PM}$ of the test medium is determined analogous to determining the transmembrane flow for water over time. From the change of the transmembrane flow $TMF_{PM}$ over time, i.e. from the ratio of the $TMF_{PM}$ after the measuring period of 10 minutes to the $TMF_{PM}$ at the beginning of the measurement, a statement about the pore blocking behavior of the membrane and thereby about its dirt-loading capacity can be derived. The membrane shows thereby a high dirt-loading capacity, if the transmembrane flow $TMF_{PM}$ of the test medium over time changes only slightly, which can be ascribed to the fact that the membrane is not appreciably blocked.

Determination of the Filtrate Flow Rate of an Aqueous Bovine Serum Albumin (BSA) Solution The filtrate flow rate of an aqueous BSA solution is determined using a cross-flow laboratory apparatus with recirculating feed stream. From the membrane to be examined, two samples of approx. 5.3 cm$^2$ each are tested in parallel. First the membrane samples are equilibrated in a phosphate buffer solution (pH 5, 67 mM) and then placed in the test cell. Initially, the flow rate for the phosphate buffer solution is measured at 0.4 bar for 60 minutes or until stable values are obtained. Afterwards, the reservoir for the feed stream is filled with a BSA solution (2 g/l, in phosphate buffer, pH 5) and the filtrate flow rate $J_{MF}$ [l/(h·m$^2$)] through the membrane samples is continuously measured at 0.4 bar for 120 minutes.

EXAMPLE 1

In a heatable boiler, 55.31 kg of a mixture of 75 wt. % of γ-butyrolactone and 25 wt. % of ε-caprolactam, conditioned to 40° C., was provided and, with stirring, 1.05 kg of sulfonated polyethersulfone (SPES) with a degree of sulfonation of 5%, was dissolved within 1 hour. Subsequently, 13.95 kg polyethersulfone (PES, Ultrason E6020, manufactured by BASF) was sprinkled in with stirring and dissolved over 4 hours. Afterwards, 11.25 kg polyvinylpyrrolidone (PVP, K30, manufactured by ISP) was finely dispersed, stirred in and homogenized. The oxygen was largely removed from the boiler by creation of a vacuum and the application of nitrogen. Following this, the boiler was heated to 95° C. and a homogeneous solution was produced over 8 hours with intensive stirring. After cooling the solution to 80° C., 18.44 kg polyethylene glycol PEG 200 was slowly added, intensively stirred in and homogenized for 3 hours. Afterwards, the casting solution was cooled to 40° C. and degassed by means of a vacuum. The resulting homogeneous solution had a viscosity of 3.6 Pa s at 40° C.

The finished casting solution was poured out by means of a casting mold conditioned to 40° C. onto a metal casting roller conditioned to 62° C. to form a film with a thickness of approx. 160 μm. The film located on the casting roller was conveyed through a climate-controlled zone and during approx. 11 seconds it was exposed to a climate of 44° C. and 48% relative humidity before it was introduced into a coagulation bath of water conditioned to 62° C. After a retention time of 11 seconds for the formation of the membrane structure, the film was withdrawn by means of a drawing-off roller at a speed increased by 9% in comparison to the casting roller speed, whereby the film or the membrane structure was drawn in order to open the surface pores. In the subsequent wash baths, the membrane was fixed in water at temperatures increasing stepwise to 90° C. and the solvent together with the greater portion of the PVP was extracted. The drying of the membrane occurred by means of a drum dryer. Within the wash and drying areas, there was a further speed increase of approx. 5%.

The membrane thus produced was permanently hydrophilic and spontaneously wettable with water and had a maximum separating pore of 0.48 μm determined by means of the bubble point method as well as a nominal pore of 0.2 μm. It had a transmembrane flow of approx. 27 000 l/(m$^2$·h·bar) as well as a porosity of 83 vol. %. The filtrate flow rate for an aqueous BSA solution was determined 15 minutes after the beginning of the filtration to be 7 400 l/h·m$^2$. The filtrate flow rates for the BSA solution after 5 minutes and after 120 minutes were 8 200 l/h·m$^2$ and 4 500 l/h·m$^2$ respectively, so that a residual filtrate flow rate of 55% resulted. The membrane had a high dirt-loading capacity. In the test, it demonstrated a relatively constant transmembrane flow $TMF_{PM}$ for the test medium used over time; after 10 minutes the $TMF_{PM}$ had dropped by only 20%.

Over its cross-section, the membrane had a structure with an interior separating layer, i.e. the layer with the minimal pore size lay within the membrane wall at a distance of approx. 10 μm from the side of the membrane, which side during production initially faced towards the air (FIG. 1, 2). According to the SEM image shown in FIG. 1, the pore size initially increased, in the direction from the layer with the minimal pore size to the roller side, in an asymmetrical region, and remained then practically unchanged over an region of approx. ¼ of the wall thickness in an essentially isotropic region. Shortly prior to reaching the adjoining membrane surface, the pore size decreased towards the roller surface. The roller side (FIG. 3) as well as the air side of the membrane (FIG. 4) had an open-pored structure. The average pore size of the pores in the roller side of the membrane was significantly above 5 μm.

EXAMPLE 2

The procedure was the same as in Example 1, except that, in the climate-controlled zone a temperature of 44° C. and a relative humidity of 62% were set.

The membrane thus obtained had a maximum separating pore of 0.65 µm, determined by means of the bubble point method, and a nominal pore of 0.45 µm. It had a transmembrane flow of approx. 54 000 l/(m²·h·bar) and showed a high permeability to BSA solutions with, at the same time, a minor drop in permeability over time. The membrane had likewise a high dirt-loading capacity. It showed in the test over time a relatively constant transmembrane flow $TMF_{PM}$; after 10 minutes, the $TMF_{PM}$ had only dropped to approx. 75% of the initial value.

Likewise, the membrane had, over its cross-section, the structure according to the invention with an interior separating layer (FIG. 5). The pore size initially increased, in the direction from the layer with the minimal pore size towards the side of the membrane that faced towards the casting roller during the membrane production, i.e. towards the roller side in an asymmetrical region, and remained then essentially unchanged over an region of approx. ⅓ of the wall thickness. Shortly prior to reaching the adjoining membrane surface, the pore size decreased towards the surface. The layer with the minimal pore size, i.e. the separating layer was located within the membrane wall at a distance of approx. 10-15 µm from the adjoining surface, i.e. from the air side of the membrane (FIG. 6). Roller side (FIG. 7) and air side of the membrane (FIG. 8) had a pronounced open-pored structure.

EXAMPLE 3

The procedure was the same as in Example 1. Unlike Example 1, the casting roller and the coagulation bath were set to a temperature of 70° C. In the climate-controlled zone, a temperature of 44° C. and a relative humidity of 69% prevailed. The drawing-off roller in the coagulation bath had a speed increased by 10% in comparison to the casting roller speed.

The membrane thus obtained had a maximum separating pore of 0.87 µm, determined by means of the bubble point method, and a nominal pore of 0.60 µm. It had a transmembrane flow of approx. 102 000 l/(m²·h·bar) and showed a high permeability in regards to BSA solutions with, at the same time, a minor drop in permeability over time. The membrane had a high dirt-loading capacity. In the test, it showed a relatively constant transmembrane flow $TMF_{PM}$ for the test medium used over time; the $TMF_{PM}$ was still at a high level after one hour.

The structure of the membrane is apparent from the SEM images shown in FIG. 9-12. According to this, the membrane likewise had, over its cross-section, an integrally asymmetrical pore structure according to the invention with an interior separating layer (FIG. 9). Similarly, for this membrane, the pore size initially increased, in the direction from the separating layer towards the roller side, then remained essentially constant from approximately the center of the wall, and finally decreased towards the roller side of the membrane. The layer with the minimal pore size, i.e. the separating layer was located within the membrane wall at a distance of approx. 15 µm from the adjoining surface, i.e. from the air side of the membrane (FIG. 10). The roller side (FIG. 11) was open-pored with large pores in the surface. The air side of the membrane (FIG. 12) likewise showed an open-pored structure with a more uniform size of the pores.

EXAMPLE 4

In a heatable boiler, 55.31 kg of a mixture of 75 wt. % of γ-butyrolactone and 25 wt. % of ε-caprolactam, conditioned to 40° C., was provided and, with stirring, 15 kg of polyethersulfone (PES, Ultrason E6020, manufactured by BASF) was sprinkled in with stirring and dissolved over 4 hours. Subsequently, 11.25 kg polyvinylpyrrolidone (PVP, K30, manufactured by ISP) was finely dispersed, stirred in and homogenized. The oxygen was largely removed from the boiler by creation of a vacuum and the application of nitrogen. Following this, the boiler was heated to 95° C. and a homogeneous solution was produced over 8 hours with intensive stirring. After cooling the solution to 80° C., 18.44 kg polyethylene glycol PEG 200 was slowly added, intensively stirred in and homogenized for 3 hours. Finally, the casting solution was cooled to 40° C. and degassed by means of a vacuum.

The finished casting solution was poured out by means of a casting mold conditioned to 30° C. onto a metal casting roller conditioned to 66° C. to form a film with a thickness of approx. 160 µm. The film located on the casting roller was conveyed through a climate-controlled zone and during approx. 11 seconds it was exposed to a climate of 42° C. and 51% relative humidity before it was introduced into a coagulation bath of water conditioned to 66° C. After formation of the membrane structure, the film was withdrawn by means of a drawing-off roller at a speed increased by 6% in comparison to the casting roller speed, whereby the film or the membrane structure was drawn in order to open the surface pores. In the subsequent wash baths, the membrane was fixed in water at temperatures increasing incrementally to 90° C. and the solvent together with the greater portion of the PVP was extracted. The drying of the membrane occurred by means of a drum dryer at approx. 60-80° C. Within the wash and drying areas, there was a further speed increase of approx. 9%.

The maximum separating pore of the membrane thus obtained had a size of 0.47 µm, determined by means of the bubble point method. The nominal pore was 0.20 µm in size. The membrane had a transmembrane flow of approx. 27 400 l/(m²·h·bar).

The membrane had, as evidenced by the SEM images, an asymmetric pore structure with a separating layer situated within the wall. The structure passed, in the direction from the separating layer towards the surface that had been facing towards the casting roller during the production of the membrane (roller side), into a pronounced coarse-pored structure. In immediate proximity to the surface, the pore structure re-compacted somewhat, whereby a good mechanical stability of the surface layer as well as of the coarse-pored layer lying beneath it was guaranteed. The structure became likewise coarse-pored towards the other surface (air side); however to a clearly lesser degree than towards the roller side.

EXAMPLE 5

In a heatable boiler, a mixture of 46.45 kg of γ-butyrolactone and 15.49 kg of ε-caprolactam, conditioned to 40° C., was provided and, with stirring, initially 1.05 kg of sulfonated polyethersulfone (SPES) with a degree of sulfonation of 5%, and subsequently, 13.95 kg polyethersulfone (PES, Ultrason E6020, manufactured by BASF) was sprinkled in with stirring and dissolved over 4 hours. Afterwards, 3.5 kg of the high-molecular PVP-K90 (manufactured by ISP) was finely dispersed, stirred in and homogenized. The oxygen was largely removed from the boiler by creation of a vacuum and the application of nitrogen. Following this, the boiler was heated to 95° C. and a homogeneous solution was produced over 8 hours with intensive stirring. After cooling the solution to 80° C., 19.56 kg polyethylene glycol PEG 200 was slowly added, intensively stirred in and homogenized for 3 hours. Finally, the casting solution was cooled to 40° C. and degassed by means of vacuum.

The finished casting solution was poured out by means of a casting mold conditioned to 30° C. onto a metal casting roller conditioned to 66° C. and having a speed of 3.0 m/min to form a film with a thickness of approx. 160 μm. The film located on the casting roller was conveyed through a climate-controlled zone and during approx. 11 seconds it was exposed to a climate of 41° C. and 47% relative humidity before it was introduced into a coagulation bath of water conditioned to 66° C. After formation of the membrane structure, the film was withdrawn by means of a drawing-off roller at a speed increased by 6% in comparison to the casting roller speed, whereby the film or the membrane structure was drawn in order to open the surface pores. In the subsequent wash baths, the membrane was fixed in water at temperatures increasing incrementally to 90° C. and the solvent together with the greater portion of the PVP was extracted. The drying of the membrane occurred by means of a drum dryer at approx. 60-80° C. Within the wash and drying areas, there was a further speed increase of approx. 9%.

The maximum separating pore of the membrane thus obtained had a size of 0.55 μm, determined by means of the bubble point method. The membrane had a transmembrane flow of approx. 45 000 l/(m²·h·bar) and showed a high permeability to BSA solutions.

EXAMPLE 6

In a heatable boiler, 22.645 kg N-methylpyrrolidone (NMP) was provided at 40° C. and, with stirring, first 7.5 kg of polyethersulfone (PES, Ultrason E6020, manufactured by BASF) and then 2.063 kg of the high-molecular PVP-K90 (manufactured by ISP) were finely dispersed, stirred in and homogenized. The oxygen was largely removed from the boiler by creation of a vacuum and the application of nitrogen. Following this, the boiler was heated to 90° C. and a homogeneous solution was produced over 6 hours with intensive stirring. After cooling the solution to 60° C., a mixture of 1.618 kg water and 16.175 kg polyethylene glycol PEG 200 was slowly added, intensively stirred in and homogenized for 3 hours. Finally, the casting solution was cooled to 40° C. and degassed by means of vacuum.

The finished casting solution was poured out by means of a casting mold conditioned to 40° C. at a production speed of 6.0 m/min onto a metal casting roller conditioned to 60° C. to form a film with a thickness of approx. 160 μm. The film located on the casting roller was conveyed through a climate-controlled zone and for approx. 11 seconds it was exposed to a climate of 43° C. and 57% relative humidity before it was introduced into a coagulation bath of water conditioned to 60° C. In the subsequent wash baths, the membrane was fixed in water at temperatures increasing incrementally to 90° C. and the solvent together with the greater portion of the PVP was extracted. The drying of the membrane occurred by means of a drum dryer at approx. 60-80° C. Within the wash and drying areas, there was a further speed increase of approx. 25%.

The maximum separating pore of the membrane thus obtained had a size of 0.56 μm, determined by means of the bubble point method. The transmembrane flow was approx. 36 000 l/(m²·h·bar).

The invention claimed is:

1. A method for producing an integrally asymmetric membrane for microfiltration in the form of a flat sheet, based on a film forming hydrophobic first polymer from the group of aromatic sulfone polymers, the integrally asymmetric membrane
    having a membrane wall with a first porous surface and a second porous surface and an interior situated between the surfaces,
    possessing a porous structure with a pore size distribution over the membrane wall, and
    having a separating layer in the wall's interior with a minimum pore size, and
    also having, in the direction from this separating layer towards the first porous surface, a first asymmetrical region, and towards the second porous surface, a second asymmetrical region, with pore sizes increasing towards the surfaces,
    the second porous surface having pores with a mean diameter of at least 1 μm and
    having a diameter of maximum separating pores of 0.1-5 μm in the separating layer,
    whereby the method comprises the following steps:
    a. producing a homogeneous casting solution from a polymer component and a solvent system, the polymer component consisting of 10-25 wt.%, relative to the weight of the solution, of the hydrophobic first polymer from the group of aromatic sulfone polymers and 2-20 wt. %, relative to the weight of the solution, of a hydrophilic second polymer, and the solvent system consisting of 5-80 wt. %, relative to the weight of the solvent system, of a solvent for the polymer component, 0-80 wt. %, relative to the weight of the solvent system, of a latent solvent for the polymer component, as well as 0-70 wt. %, relative to the weight of the solvent system, of a non-solvent for the polymer component,
    b. conditioning the homogeneous casting solution to a molding temperature,
    c. pouring the homogeneous casting solution onto a carrier to form a film, which carrier is temperature controlled and has a temperature that is at least 15° C. higher than the molding temperature of the casting solution, and which carrier has a speed v1,
    d. conveying the film located on the carrier through a climate-controlled zone with a temperature in the range from 35 to 55° C. and a relative humidity in the range from 40 to 75%,
    e. introducing the film located on the carrier into a coagulation medium and initiating the coagulation of the film for the formation of a membrane structure,
    f. withdrawing the membrane structure from the carrier within the coagulation medium by means of withdrawal device moving with a speed of v2, the speed v2 being greater than the speed v1 of the carrier, by which means the membrane structure is drawn,
    g. stabilizing the membrane structure in the coagulation medium,
    h. extracting the resulting membrane and subsequently drying the membrane.

2. Method according to claim 1, characterized in that the aromatic sulfone polymer is a polysulfone or a polyethersulfone.

3. Method according to claim 2, characterized in that the hydrophilic second polymer has an average molecular weight MW of more than 10 000 daltons.

4. Method according to claim 3, characterized in that polyvinylpyrrolidone, polyethylene glycol, polyvinyl alcohol, polyglycol monoester, polysorbitate, carboxymethylcellulose, polyacrylic acid, polyacrylate, or a modification or a copolymer of these polymers is used as the hydrophilic second polymer.

5. Method according to claim 1, characterized in that the viscosity of the homogeneous casting solution is set to a viscosity below 10 Pa s, determined at 40° C.

6. Method according to claim 1, characterized in that the ratio of the speed v2 of the withdrawal device to the speed v1 of the carrier lies in the range between 1.05:1 and 1.2:1.

7. Method according to claim 1, characterized in that a polar, aprotic solvent or a protic solvent is used as the solvent for the polymer component.

8. A method for producing an integrally asymmetric membrane for microfiltration in the form of a flat sheet, based on a film forming hydrophobic first polymer from the group of aromatic sulfone polymers, the integrally asymmetric membrane having a membrane wall with a first porous surface and a second porous surface and an interior situated between the surfaces, possessing a porous structure with a pore size distribution over the membrane wall, and having a separating layer in the wall's interior with a minimum pore size, and also having, in the direction from this separating layer towards the first porous surface, a first asymmetrical region, and towards the second porous surface, a second asymmetrical region, with pore sizes increasing towards the surfaces, the second porous surface having pores with a mean diameter of at least 1 µm and having a diameter of maximum separating pores of 0.1-5 µm in the separating layer, whereby the method comprises the following steps:

a. producing a homogeneous casting solution from a polymer component and a solvent system, the polymer component consisting of 10-25 wt. %, relative to the weight of the solution, of the hydrophobic first polymer from the group of aromatic sulfone polymers and 2-20 wt. %, relative to the weight of the solution, of a hydrophilic second polymer, and 0.220 wt. %, relative to the weight of the casting solution, of a hydrophilic third polymer, which is different from the hydrophilic second polymer, the hydropholic third polymer being a hydrophilocally modidied aromatic suffone polymer, and the solvent system consisting of 5-80 wt. %, relative to the weight of the solvent system, of a solvent for the polymer component, 0-80 wt. %, relative to the weight of the solvent system, of a latent solvent for the polymer component, as well as 0-70 wt. %, relative to the weight of the solvent system, of a non-solvent for the polymer component, b. conditioning the homogeneous casting solution to a molding temperature, c. pouring the homogeneous casting solution onto a carrier to form a film, which carrier is temperature controlled and has a temperature that is at least 15° C. higher than the molding temperature of the casting solution, and which carrier has a speed v1, d. conveying the film located on the carrier through a climate-controlled zone with a temperature in the range from 35 to 55° C. and a relative humidity in the range from 40 to 75%, e. introducing the film located on the carrier into a coagulation medium and initiating the coagulation of the film for the formation of a membrane structure, f. withdrawing the membrane structure from the carrier within the coagulation medium by means of withdrawal device moving with a speed of v2, the speed v2 being greater than the speed v1 of the carrier, by which means the membrane structure is drawn, g. stabilizing the membrane structure in the coagulation medium, h. extracting the resulting membrane and subsequently drying the membrane.

9. Method according to claim 8, characterized in that the hydorphilically modified aromatic sulfone polymer is a sufoned sulfone polymer.

\* \* \* \* \*